(12) United States Patent
Miller

(10) Patent No.: US 8,215,055 B2
(45) Date of Patent: Jul. 10, 2012

(54) PROTECTIVE GUARD FOR USE WITH VEGETATION

(76) Inventor: Cameron M. Miller, Macomb, MI (US)

( * ) Notice: Subject to any disclaimer, the term of this patent is extended or adjusted under 35 U.S.C. 154(b) by 455 days.

(21) Appl. No.: 12/482,544

(22) Filed: Jun. 11, 2009

(65) Prior Publication Data

US 2010/0313470 A1 Dec. 16, 2010

(51) Int. Cl.
*A01G 13/02* (2006.01)
(52) U.S. Cl. .......................................................... 47/31
(58) Field of Classification Search ............... 47/2, 20.1, 47/30, 31, 32.2, 32.3
See application file for complete search history.

(56) References Cited

U.S. PATENT DOCUMENTS

| | | | |
|---|---|---|---|
| 1,282,677 A * | 10/1918 | Comstock | 47/23.3 |
| 1,930,404 A * | 10/1933 | Wagner | 135/87 |
| 2,028,220 A * | 1/1936 | Kelly | 47/31 |
| 2,118,474 A | 5/1938 | Morton | |
| 2,251,624 A | 8/1941 | Foree et al. | |
| 2,844,915 A | 7/1958 | Woelk | |
| 3,088,244 A | 5/1963 | Commisso | |
| 3,100,950 A | 8/1963 | Heuer | |
| 3,537,688 A * | 11/1970 | Stein | 135/95 |
| 3,581,436 A | 6/1971 | Basiger | |
| 4,020,591 A | 5/1977 | Seffinga et al. | |
| 4,160,340 A | 7/1979 | Levett | |
| 4,265,049 A | 5/1981 | Gorewitz | |
| 4,285,162 A | 8/1981 | Hilton | |
| 4,347,685 A | 9/1982 | Medford et al. | |
| 4,392,326 A | 7/1983 | Boria | |
| 4,416,928 A | 11/1983 | Carl | |
| 4,606,070 A * | 8/1986 | Schachter | 383/4 |
| 4,685,484 A * | 8/1987 | Moneta | 135/87 |
| 4,785,576 A | 11/1988 | Morgan | |
| 4,829,707 A | 5/1989 | Koffler et al. | |
| 4,838,525 A * | 6/1989 | Snow et al. | 256/26 |
| 4,903,431 A | 2/1990 | Stoll | |
| 5,029,819 A * | 7/1991 | Kane | 256/24 |
| 5,083,396 A | 1/1992 | Traut | |
| 5,265,373 A | 11/1993 | Vollebregt | |
| 5,388,782 A * | 2/1995 | King | 242/557 |
| 5,437,298 A | 8/1995 | Lin | |
| 5,595,230 A * | 1/1997 | Guerra | 160/135 |
| 5,605,008 A | 2/1997 | Johnston et al. | |
| 5,609,176 A * | 3/1997 | Weeks | 135/96 |
| D410,289 S * | 5/1999 | Howard et al. | D25/38 |
| 5,992,088 A | 11/1999 | Henningsson et al. | |
| 6,038,810 A | 3/2000 | Kocsis, Jr. | |
| 6,088,953 A | 7/2000 | Morgan | |
| 6,092,792 A * | 7/2000 | Camara | 256/24 |
| 6,158,923 A * | 12/2000 | Wheeler et al. | 405/116 |
| D440,411 S * | 4/2001 | Gomes, Jr. | D6/332 |
| 6,357,172 B1 | 3/2002 | Risgaard et al. | |

(Continued)

*Primary Examiner* — Frank T Palo
(74) *Attorney, Agent, or Firm* — VanOphem & VanOphem, P.C.

(57) ABSTRACT

An apparatus for covering or protecting vegetation, in particular landscaping. The apparatus includes an elongated sheet of material having an upper edge and a lower edge. Spaced along the length of the elongated sheet are a plurality of stake pockets extending transversely to the longitudinal axis of the elongated sheet. The stake pockets receiving a stake used to secure the cover to a surface, typically the ground. Accordingly, the elongated sheet surrounds or is placed adjacent to the landscaping and the stakes are either inserted into the stake pockets or attached to the sheet using the stake pockets and correspondingly hold the elongated sheet upright and in place. In addition, a plurality of eyelets on the elongated sheet can be used to both hang decorations and anchor the elongated sheet to the ground surface.

18 Claims, 3 Drawing Sheets

U.S. PATENT DOCUMENTS

| | | |
|---|---|---|
| 6,625,924 B2 | 9/2003 | Lundgren |
| 6,810,618 B1 | 11/2004 | Hauser |
| 6,824,332 B2 * | 11/2004 | Root .......................... 405/302.7 |
| D500,612 S * | 1/2005 | Allen et al. .................... D6/417 |
| 2002/0172564 A1 * | 11/2002 | Brown ....................... 405/302.6 |
| 2005/0155284 A1 * | 7/2005 | Kulas ............................... 47/31 |
| 2010/0313170 A1 * | 12/2010 | Ramos et al. ................. 715/838 |

* cited by examiner

PROTECTIVE GUARD FOR USE WITH VEGETATION

CROSS-REFERENCE TO RELATED APPLICATIONS

Not applicable.

BACKGROUND OF THE INVENTION

1. Field of the Invention

The present invention is related to an apparatus for use with garden plants including vegetables, flowers, shrubs, seedlings and the like; and more specifically, to a covering used to protect vegetation from the elements, during the winter months, as well as from unwanted animal critters.

2. Description of Related Art

Various types of plant coverings, including temporary and reusable structures, have been used for years to protect garden plantings from the elements. Garden plantings such as trees, shrubs, plants, flowers and ground cover are often used to landscape homes or other structures. Modern-day homeowners often go to great costs when landscaping their homes. Depending upon the type, style and amount of landscaping, the cost and value of a home may increase significantly. Accordingly, the homeowner has a vested interest in protecting the landscaping from the elements particularly in cold weather environments as well as from those pesky animal critters who feed on the seedlings resulting in severely hindering the growth or development.

In order to protect the landscaping, many types of coverings and covering supports have been used. Tightly wrapping a fabric material around small trees or bushes is one way to provide protection from the elements. Such activity can be labor and cost intensive. In addition, a plurality of stakes are driven into the ground adjacent the landscaping and a sheet of material is then attached to the stakes to provide cover for the landscaping, for example the material is placed or staked adjacent bushes or shrubs. Once again, such a process is labor intensive and is often left to the skill of the laborer to properly stake and fasten the fabric as necessary to protect the landowner's landscaping.

As set forth above, protective coverings for vegetation have been known for some time. For example, Seffinga et al., U.S. Pat. No. 4,020,591 discloses a tunnel type covering that can be folded up and packed into a cylindrical shaped container. When assembled over a flower bed, several spaced apart arches or wickets are driven into the ground and covered by a synthetic resin sheet gathered at the ends and fastened to pegs or stakes driven into the ground at the end of the row of wickets.

Gorewitz, U.S. Pat. No. 4,265,049 discloses a reusable temporary cover for houseplants to retain moisture for the plant. The cover is formed of a flexible transparent plastic sheet material with a tie or drawstring located at the bottom thereof. The sheet material is placed over the plant and the drawstring is pulled to secure and completely enclose the houseplant.

Koffler et al., U.S. Pat. No. 4,829,707 discloses a cylindrical cover for plants used to protect plants or vegetation from meteorological elements, insects, birds and other small animals.

Lin, U.S. Pat. No. 5,437,298 discloses a sun shade arrangement that protects plants from birds, insects, pests and adverse weather conditions. It uses a mechanism having two sets of two stakes each. A roll of screening material, or the like is attached to one of these sets of stakes and a take-up reel is attached to the other set of stakes. The roll of material and the take-up reel are provided with a swivel and adjustment means so that the individual ends of the row, and particularly, the individual corners thereof may be tilted, raised, lowered and the like to accommodate the different types of plants so as to provide for rain runoff, shading, and/or shielding from birds.

Lundgren, U.S. Pat. No. 6,625,924 discloses a frame structure arranged to be supported on the ground adjacent to a planted area when a roller is arranged and selectively coupled to the frame structure for rotation about an axis of the roller. An elongated main sheet extends in a longitudinal direction. The main sheet is coupled to the roller at one end with the free end of the main sheet being arranged to be selectively coupled to the frame structure spaced from the roller. Accordingly, the main sheet is placed over the frame structure with the main sheet including a plurality of sheets that are suspended from the respective sides of the main sheet and defining an enclosure over the planted area. Additionally, Lundgren shows the use of hook and loop fasteners as tie strips between the seams of various side panels to connect the flaps to the frame.

One problem with the prior art is that it typically refers to some type of structure or enclosure for covering vegetation which involves assembling a frame and then covering the frame with a sheet of material. Such systems are often very complicated and expensive. Typically do not have a great deal of versatility, nor are they suitable for covering different types and sizes of vegetation. Since applying a covering to landscape vegetation in the past has typically been a time consuming and thus costly endeavor, it is desirable to have an apparatus that is easily secured adjacent to and protects the multiple types, styles, and sizes of plantings for landscaping and is available in prepackaged form to reduce the labor requirements for installations.

SUMMARY OF THE INVENTION

The present invention includes a sheet or strip of material used to cover or protect vegetation, in particular landscaping of the type including trees, bushes, shrubs, plants and other vegetation. The material may be reclaimable or reusable for an example a breathable fabric material and is available in predetermined widths so that plantings of various heights may be accommodated. The continuous sheet or strip has a plurality of eyelets or openings spaced along the upper and lower edges thereof. In addition, a plurality of stake pockets or mounting sleeves, extending across the longitudinal axis of the sheet, are spaced along the length thereof, thereby the spacing being a function of the width of the sheet or strip providing predetermined spacing for support stakes. The stake pockets or mounting sleeves extend from the upper to the lower edges of the sheet or strip. The stake pockets, sized to receive a stake, are used to secure the sheet or strip in position adjacent the vegetation.

In another aspect of the invention, for some applications where exact configuration of the plantings to be protected is known in advance, the stakes maybe inserted into the stake pockets or mounting sleeves of a pre-cut length of sheet or strip prior to the sheet or strip being rolled up whereby as the sheet is removed from the prefabricated roll, the stakes are already in position for installing the cover.

In another aspect of the invention, the fabric maybe manufactured from various materials and colors such that it blends into the surrounding landscape. For example, the fabric may contain a decorative print resembling the specific vegetation it is covering. In addition, it may contain decorative patterns to provide added aesthetic appeal and maintain the natural beauty of the landscape.

In yet a further aspect of the invention, the sheet or strip is provided with a plurality of eyelets or openings along the upper and lower edges thereof. Providing total flexibility to the installer in that the sheet or strip with its mounting sleeves and upper and lower eyelets are completely symmetrical along the longitudinal axis. The eyelets provide attachments for decorative Christmas lighting arrangements if desired by the homeowner.

Accordingly, it is an object of the present invention to provide a vegetation cover suitable for use with landscape vegetation. With the cover being easily removed from a roll and secured adjacent to the vegetation to both protect the vegetation from the elements and provide added aesthetic appeal.

These objects and other features, aspects and advantages of this invention will be more apparent after a reading of the following detailed description, appended claims and accompanying drawings.

DETAILED DESCRIPTION OF THE PREFERRED EMBODIMENT

Turning now to FIGS. 1-4 there is shown one embodiment of a protective cover installed surrounding a row of bushes or evergreens, seen generally at 10, used to cover or protect landscaping such as a hedge 12. While shown herein used to cover or protect a hedge 12, the cover 10 is suitable for use in protecting or covering various types of vegetation such as trees, shrubs or bushes, plants, ground cover, flowers or other landscaping. In addition, the cover 10 may also be associated with or used to protect other vegetation; in particular, crops including edible plants, fruits and vegetables.

The cover 10 is formed of a fabric material, an example of which is a type of burlap material, typically formed of jute, flax or hemp. Such a material is permeable and allows moisture to pass while reducing environmental damage caused by wind or snow loads on the vegetation. The cover 10 may also be formed of a plastic, vinyl or other materials provided the material functions to protect the plant or vegetation from the weather, animals and other elements that may cause damage, such as snow, wind, salt or other deicing materials used during winter months. Accordingly, depending upon the particular usage, the materials may often assist in trapping moisture while providing adequate protection against damage. In addition to the type of material used to fabricate the cover 10, the material can also vary as to design and pattern. For example, the color and pattern of the material may vary, including use of decorative patterns such as holiday designs or patterns that blend into the landscape such as camouflage patterns. In addition, the fabric can be colored green or have a leaf pattern to simulate vegetation, including the vegetation it is protecting.

Figure 1:
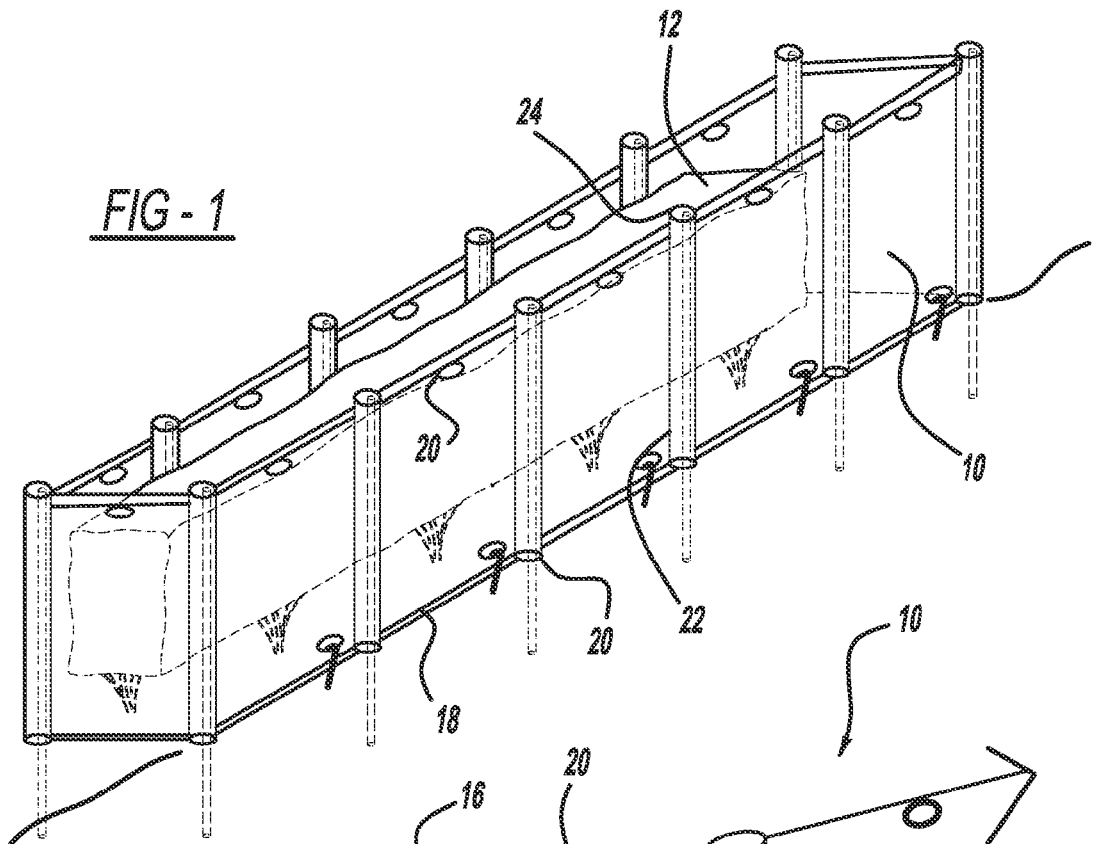
FIG. 1 is a perspective view of a strip installation as a protective cover used to protect a type of vegetation such as a hedge or plurality of shrubs.
Figure 2:
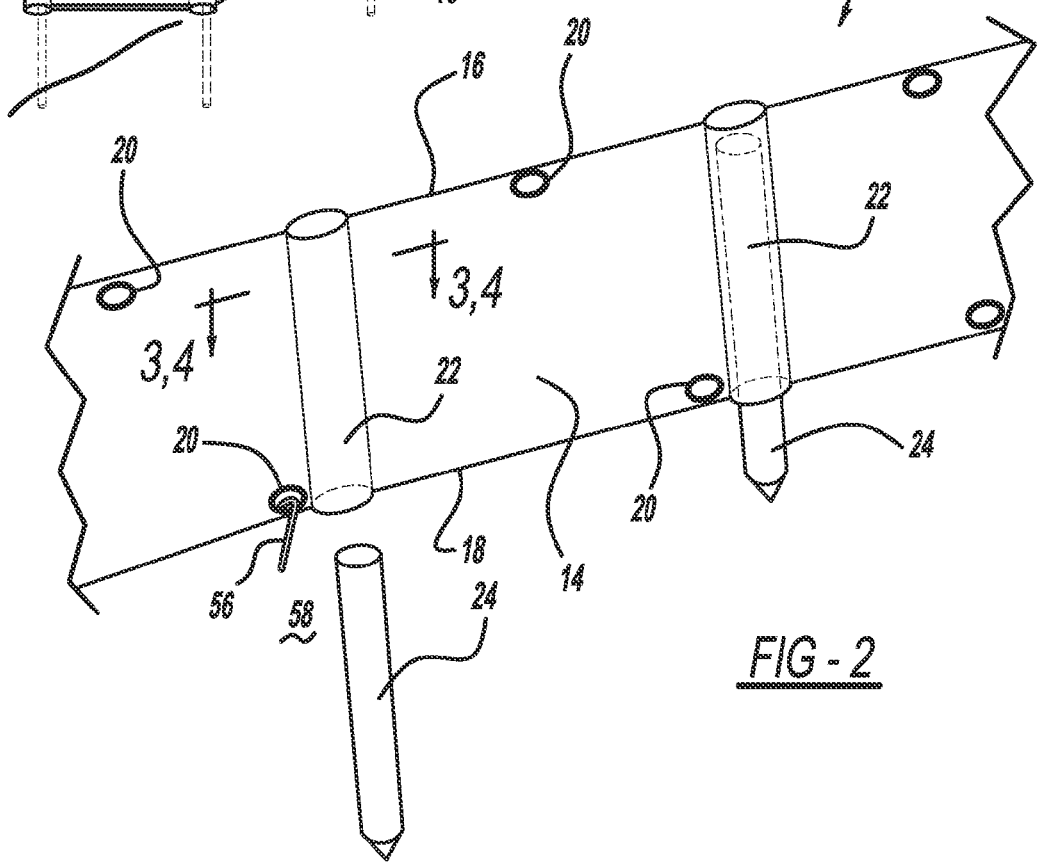
FIG. 2 is a partial perspective view of a typical pocket or mounting sleeve arrangement of the cover configuration illustrated in FIG. 1.

As illustrated further in FIG. 2, the cover 10 is generally an elongated sheet or strip 14 of material having an upper edge 16 and a lower or bottom edge 18. A plurality of eyelets 20 are located on the sheet 14, typically adjacent the upper and lower edges 16, 18. The sheet 14 further includes a plurality of mounting sleeves or stake pockets 22 extending across the sheet 14 between the upper and lower edges 16, 18. The mounting sleeves or stake pockets 22 are closed at the upper edge 16 to keep the sheet 14 expanded and not allow the sheet 14 to gather at the bottom of an elongated stake 24. The mounting sleeves or stake pockets 22 are sized to receive an elongated stake 24 used to secure the cover 10 in position adjacent to the vegetation, illustrated in FIG. 1 as a hedge 12.

Figure 3:
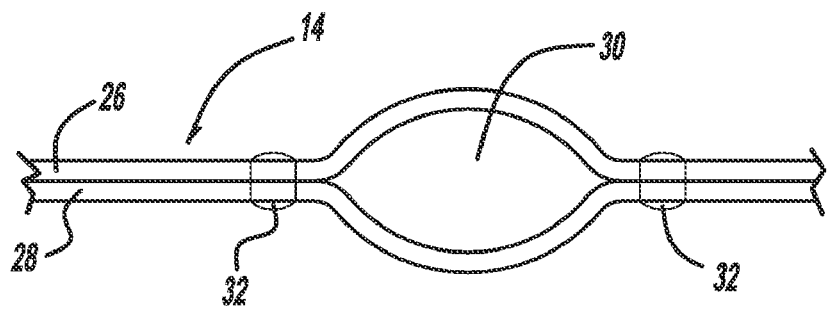
FIG. 3 is a partial top section view of a pocket or mounting sleeve arrangement illustrated in FIG. 2.
Figure 3A:
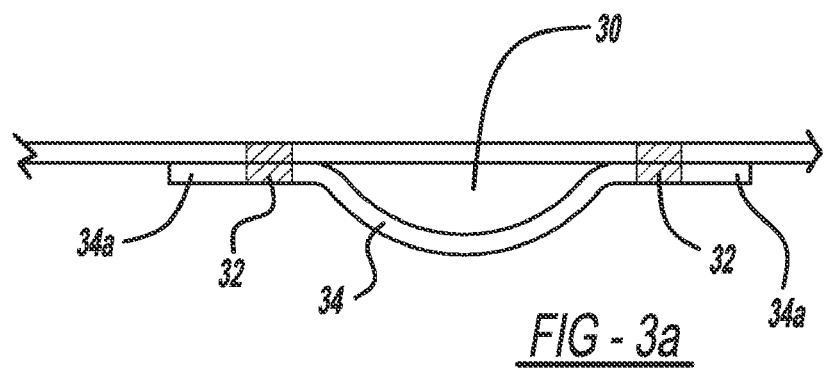
FIG. 3a is a partial top section view of a pocket or mounting sleeve arrangement illustrated in FIG. 2 showing an alternative embodiment of attaching a mounting sleeve, or the creation of a pocket or mounting sleeve from a double layer sheet or strip material.

The mounting sleeves or stake pockets 22 can be provided on the sheet or strip 14 of material in different ways. For example, as illustrated in FIG. 3 the sheet or strip 14 of material is of two ply construction, including a first ply 26 and a second ply 28 joined or laminated together. A portion of the two ply sheet or strip 14 of material is left unjoined, thereby forming a gap or opening 30 between the respective first and second plies 26, 28. The opening 30 forms the mounting sleeve or stake pocket 22. Depending upon the material forming the strip or sheet 14, welds or welts 32 are formed adjacent to the opening 30 to provide additional strength and prevent separation of the respective first and second plies 26, 28. While the entire cover 10 is shown formed of two plies 26, 28 of the sheet 14 material, this is for illustrative purposes only. As illustrated in FIG. 3a, a single strip or ply of material 34 can be attached to the sheet 14 at both ends 34a to form the mounting sleeve or stake pocket 22 thereby eliminating the need for a two ply construction.

Figure 4:
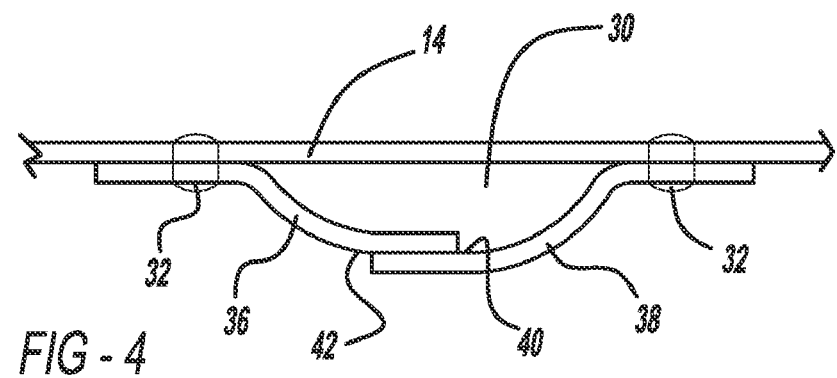
FIG. 4 is a partial top section view of a pocket or mounting sleeve arrangement illustrated in FIG. 2 showing a further alternative embodiment of a mounting sleeve attached to the sheet or strip material.

FIG. 4 illustrates a further embodiment of the mounting sleeve or stake pocket 22 including a first strip of material 36 secured to the sheet 14 and a second strip of material 38 also secured to sheet 14 in spaced relation to the first strip. The first and second strips of material 36, 38 are joined together such that the inner surface 40 of the second strip of material 38 contacts the outer surface 42 of the first strip of material 36. The first and second strips of material 36, 38 cooperating with the sheet 14 to form the opening 30. The first and second strips of material 36, 38 are joined at their respective outer and inner surfaces, 42, 40 using adhesive, or a releasable fastener such as a hook and loop fastener. The adhesive can be applied to one of the first and second strips 36, 38 and may be protected by a peelable cover which is removed prior to fastening the respective first and second strips, 36, 38 together.

Figure 4A:
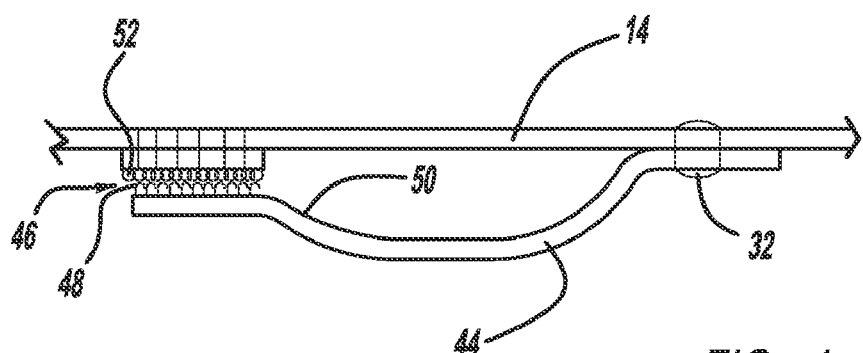
FIG. 4a is a partial top section view of the pocket or mounting sleeve arrangement illustrated in FIG. 2 showing yet a further alternative embodiment of a mounting sleeve attached to the sheet or strip material.

Prior to installation, the cover 10 can be stretched out and the stake placed in the opening 30 of the mounting sleeve or stake pocket 22 with the first and second strips of material 36, 38 adjustability tightened to secure the stake 24 within the mounting sleeve or stake pocket 22 and correspondingly secure the cover 10 to the stake 24. FIG. 4a illustrates an additional embodiment of a mounting sleeve or stake pocket 22 wherein a single strip of material 44 attaches to the sheet 14 of material using a releasable fastener such as a hook and loop fastener seen generally at 46. As illustrated the single strip of material 44 includes a plurality of hooks 48 located on the inner surface 50 of the strip of material 44 with the loop or pile portion 52 of the hook and loop fastener located on the sheet 14. Accordingly, the single strip 44 enables the cover 10 to be stretched after which the single strip 44 secures the cover 10 to the stake 24. As set forth above, a fast cure adhesive could be used in place of the hook and loop fastener 46 wherein the adhesive connects the strip 44 to the elongated sheet 14.

Figure 5:
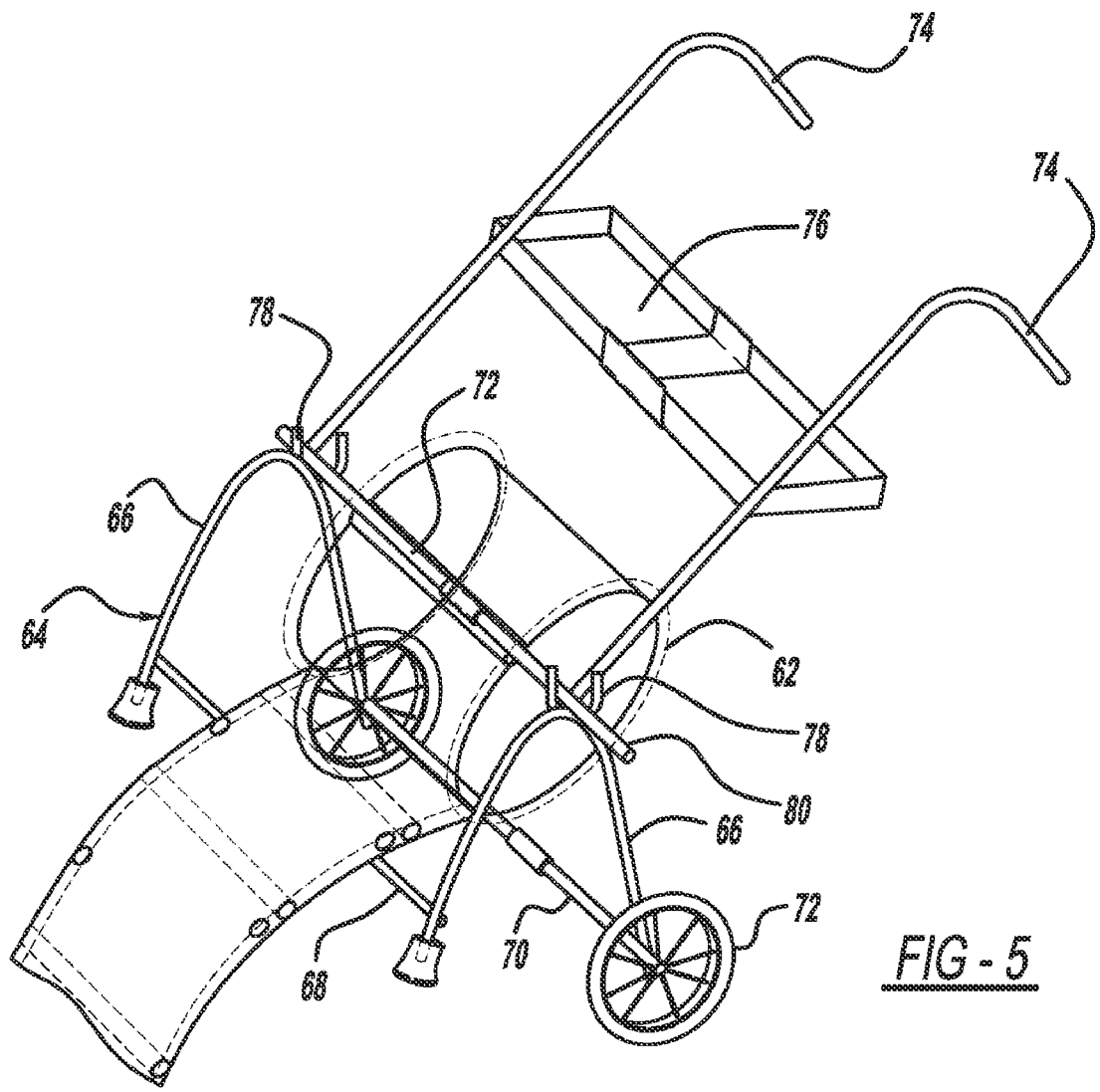
FIG. 5 is a perspective view of a dispenser cart used to support and dispense a roll of the sheet or strip material to provide a protective cover.

The invention contemplates that the sheet 14 of material is available in various sizes and widths depending upon the height of the particular vegetation sought to be protected. In addition, the cover 10 is prefabricated and supplied as a roll 62, as illustrated in FIG. 5, from which an installer removes or unwinds a suitable length to cover the vegetation. It is contemplated that the stakes 24 may be inserted into the mounting sleeves or stake pockets 22 prior to or during the fabrication process. Accordingly, in one embodiment, the cover 10 is unwound or removed from the roll 62 with the stakes 24 already located thereon. Further, it is contemplated that the cover 10 may be removed from the roll 62 without the stakes 24 and the stakes 24 inserted in the particular mounting sleeves or stake pockets 22 afterwards. Specifically, the stakes 24 slide in the stake pockets 22 such that the cover 10 can be unwound and stretched taut around the vegetation. Once the cover 10 is located and stretched taut the stakes 24 are slipped into the stake pockets 22 and driven into the ground to support the cover 10.

The eyelets 20 located along the lower or bottom edge 18 are used to secure the cover 10 to the ground. For example as illustrated in FIG. 2 anchors 56 are used to secure the cover 10 to the ground surface 58. The eyelets 20 located along the upper edge 16 are suitable for attaching decorations such as Christmas lights, labels or other ornaments to the cover 10 thus decorating the vegetation. Use of a cover 10 having a plurality of mounting sleeves or stake pockets 22 provides a reclaimable or reusable product that can be reused while at the same time being economical and not labor intensive for installing.

Figure 5A:
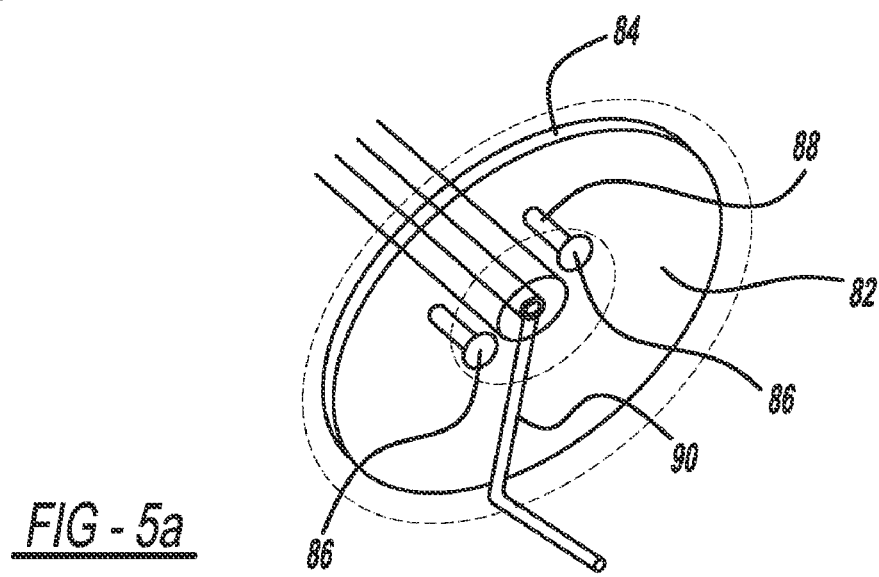
FIG. 5a is a partial perspective view of the spool and crank mechanism used for winding up a cover onto the roll.

FIG. 5 illustrates a cart 60 used for dispensing the prefabricated cover 10 from a roll 62 thereof. Specifically, the cart 60 includes a frame, seen generally at 64, including a pair of generally U-shaped support members 66 interconnected by a front support 68 and an axle member 70. A pair of wheels 72 are attached to the axle member 70. Handles 74 are attached to the support members 66 with a tray 76 extending between the handles 74. U-shaped brackets 78 are attached to the U-shaped support members 66 and form a cradle for receiving a shaft 80 supporting the roll 62 of cover 10 material. The cart operates in a very simple manner in that the shaft 80 is inserted through the roll 62 of cover 10 material with roll 62 and shaft 80 lifted together and placed on the cart 60 such that the shaft 80 rests in the U-shaped brackets 78 whereby the cover 10 is simply pulled off of the roll 62. The roll 62 of cover 10 material may be installed or placed on a spool 82, see FIG. 5a, in which outer flanges 84 of the spool 82 may include drive holes 86 through which pins 88 from a crank mechanism 90 may be inserted to provide additional assistance in removing or winding up the cover 10 onto the roll 62.

During installation, cover 10 is placed on the cart 60 and wheeled into position wherein an installer pulls on the free end of the cover 10 until a suitable amount of cover 10 is removed from the roll 62. The cover 10 is then laid out and either initially staked to the ground using the eyelets 20 located adjacent the lower edge 18 or held upright with a stake 24 located in the initial mounting sleeve or stake pocket 22 and driven into the ground. The cover 10 is then stretched taut and additional stakes 24 are then slid into the mounting sleeves 22 or fastened to the cover 10 depending upon the particular design of the mounting sleeves 22 whereby the stakes 24 support the cover 10 in the proper position. When desired, decorations can be hung or attached to the cover 10 from the eyelets 20 located along the upper edge 16 of the cover 10 providing the ability to decorate the vegetation without the need to remove the cover 10.

The following description of the preferred embodiment(s) is merely exemplary in nature and is in no way intended to limit the invention, its application, or uses.

What is claimed is:

1. A cover for protecting landscape plants, said cover comprising:
    a first layer of an elongated sheet material having a longitudinal axis, said first layer of said elongated sheet further comprising:
        an upper edge;
        a lower edge opposite said upper edge;
        a first plurality of eyelets attached to said first layer of elongated sheet material along said upper edge thereof; and
        a second plurality of eyelets attached to said first layer of elongated sheet material along said lower edge thereof;
    a second layer of material having first and second longitudinal edges, said first and second longitudinal edges attached to said first layer of elongated sheet material at predetermined intervals along said longitudinal edges of said first layer of elongated sheet material, said second layer of material defining a plurality of stake pockets disposed on said first layer of elongated sheet material across said longitudinal axis, each of said plurality of stake pockets having a closed top portion suitable for receiving a stake used to secure said cover.

2. A cover for protecting nursery plants as set forth in claim 1 wherein said plurality of stake pockets are disposed on said first layer of elongated sheet such that said stake pockets extend from said upper edge and said lower edge.

3. A cover for protecting nursery plants as set forth in claim 1 wherein said first layer of elongated sheet material is a two ply construction formed of a first ply and a second ply joined together, a portion of said two ply construction left unjoined thereby forming an opening between said first ply and said second ply, said opening forming said stake pocket.

4. A cover for protecting nursery plants as set forth in claim 1 wherein said second layer of material includes a single strip of material fastened at both ends thereof to said elongated sheet material and defining an opening between said single strip of material and said elongated sheet, said opening forming said stake pocket.

5. A cover for protecting nursery plants as set forth in claim 1 wherein said second layer of material further comprises a first strip attached to said elongated sheet material and a second strip attached to said first layer of elongated sheet material, said first and second strips joined together to define an opening, said opening forming said stake pocket.

6. A cover for protecting nursery plants as set forth in claim 5 wherein said first and second strips are releasably joined together, said first and second strips cooperating when joined to adjust the size of the opening forming said stake pocket to secure said stake within said opening and allow for variances in stake size.

7. A cover for protecting nursery plants as set forth in claim 6 wherein said first and second strips are releasably and adjustably joined using a hook and loop fastener.

8. A cover for protecting nursery plants as set forth in claim 1 wherein said second layer of material further comprises a first strip attached on one end thereof to said first layer of elongated sheet material and having a fastener located on an opposite end for attaching said opposite end to said first layer of elongated sheet material to define an opening forming said stake pocket.

9. A cover for protecting nursery plants as set forth in claim 8 including said fastener being an adhesive.

10. A cover for protecting nursery plants as set forth in claim 8 including said fastener being a hook and loop fastener, one of said strip and said first layer of elongated sheet material having said loop of said hook and loop fastener attached thereto and said second of said strip and said first layer of elongated sheet material having said hook of said hook and loop fastener attached thereto.

11. A cover for protecting nursery plants as set forth in claim 1 including said first layer of elongated sheet material formed of a permeable material.

12. A cover for protecting nursery plants as set forth in claim 1 wherein said first layer of elongated sheet material is formed of burlap.

13. A cover for protecting nursery plants as set forth in claim 1 including said first layer of elongated sheet material formed of a material having a design located thereon.

14. A cover for protecting nursery plants comprising:
a first layer of an elongated sheet material having a longitudinal axis, said first layer of elongated sheet material further comprising:
an upper edge and a lower edge opposite said upper edge; and
a plurality of eyelets located along said upper edge and said lower edge;
a second layer of material having first and second longitudinal edges, said first and second longitudinal edges attached to said first layer of elongated sheet material at predetermined intervals along said longitudinal edges of said first layer elongated sheet material, said second layer of material defining a plurality of stake pockets disposed on said first layer of elongated sheet material, said stake pockets extending from said upper edge to said lower edge, each of said plurality of stake pockets having a closed top portion suitable for receiving a stake used to secure said cover to a surface, said second layer of material including a first strip having one end attached to said first layer of elongated sheet material and a second strip having one end attached to said first layer of elongated sheet material, said first and second strips joined together to define an opening, said opening forming said stake pocket; and
said first and second strips are releasably joined together using hook and loop fastener, said first and second strips cooperating when joined to adjust the size of the opening forming said stake pocket to secure said stake within said opening and allow for variances in stake size.

15. A cover for protecting nursery plants as set forth in claim 14 including said first layer of elongated sheet material made of a permeable fabric.

16. A kit for covering nursery plants comprising:
a roll of a first layer of elongated sheet material having an upper edge; a lower edge; and a plurality of eyelets located along said upper edge and said lower edge;
a second layer of material having first and second longitudinal edges, said first and second longitudinal edges attached to said first layer of elongated sheet material at predetermined intervals along said longitudinal edges of said first layer of elongated sheet material, said second layer of material defining a plurality of stake pockets disposed on said first layer of elongated sheet material, said stake pockets extending from said upper edge to said lower edge, each of said plurality of stake pockets having a closed top portion suitable for receiving a stake used to secure said cover to a surface, said second layer of material including a first strip having one end attached to said first layer of elongated sheet material and a second strip having one end attached to said first layer of elongated sheet material, said first and second strips joined together to define an opening, said opening forming said stake pocket; and
a plurality of stakes.

17. A kit for covering nursery plants as set forth in claim 16 including a cart for supporting said roll of said first layer of elongated sheet material.

18. A kit for covering nursery plants as set forth in claim 16 including a plurality of anchors, used for securing said eyelets along said lower edge of said first layer of elongated sheet material to a ground surface.

* * * * *